(12) United States Patent
Kearney

(10) Patent No.: US 7,210,096 B2
(45) Date of Patent: Apr. 24, 2007

(54) METHODS AND APPARATUS FOR CONSTRUCTING SEMANTIC MODELS FOR DOCUMENT AUTHORING

(75) Inventor: Robert D. Kearney, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 09/774,261

(22) Filed: Jan. 30, 2001

(65) Prior Publication Data

US 2002/0103835 A1 Aug. 1, 2002

(51) Int. Cl.
*G06F 17/00* (2006.01)
*G06F 7/00* (2006.01)

(52) U.S. Cl. ............ 715/513; 715/530; 715/523; 707/100; 707/104.1

(58) Field of Classification Search ........ 715/530, 715/513, 501.1, 517, 523; 707/1, 104.1, 707/100
See application file for complete search history.

(56) References Cited

U.S. PATENT DOCUMENTS

| | | | |
|---|---|---|---|
| 6,507,856 B1 * | 1/2003 | Chen et al. ............ | 715/513 |
| 6,596,031 B1 * | 7/2003 | Parks ............... | 715/513 |
| 6,604,100 B1 * | 8/2003 | Fernandez et al. ...... | 707/3 |
| 6,668,354 B1 * | 12/2003 | Chen et al. ............ | 715/517 |
| 6,950,985 B2 * | 9/2005 | Lee .................... | 715/513 |
| 2002/0143815 A1 * | 10/2002 | Sather ................. | 707/513 |
| 2003/0110279 A1 * | 6/2003 | Banerjee et al. ....... | 709/232 |
| 2003/0208473 A1 * | 11/2003 | Lennon ............... | 707/3 |
| 2004/0002952 A1 * | 1/2004 | Lee et al. ............. | 707/1 |
| 2004/0064803 A1 * | 4/2004 | Graves et al. ......... | 717/104 |
| 2004/0153967 A1 * | 8/2004 | Bender et al. ......... | 715/513 |
| 2004/0205562 A1 * | 10/2004 | Rozek et al. .......... | 715/513 |
| 2005/0262115 A1 * | 11/2005 | Hu et al. ............. | 707/100 |
| 2006/0041838 A1 * | 2/2006 | Khan ................. | 715/513 |

\* cited by examiner

*Primary Examiner*—Stephen Hong
*Assistant Examiner*—Adam L Basehoar
(74) *Attorney, Agent, or Firm*—Ryan, Mason & Lewis, LLP

(57) ABSTRACT

Techniques for forming a document model for constructing a semantically and syntactically valid document are provided. In one embodiment, a method for forming a document model for constructing a semantically and syntactically valid document includes the steps of: creating a root tag element corresponding to a root of the document to be constructed, the root tag element including information relating to a corresponding tag; associating one or more model elements with the root tag element, each model element representing an alternative to the information relating to the corresponding tag; and for each of the model elements, creating a syntactically and semantically valid sub-tree of elements based at least in part upon a structure of the document to be constructed under one or more predetermined conditions.

20 Claims, 3 Drawing Sheets

METHODS AND APPARATUS FOR CONSTRUCTING SEMANTIC MODELS FOR DOCUMENT AUTHORING

FIELD OF THE INVENTION

This invention relates generally to electronic document authoring, and more particularly relates to techniques for constructing a semantic model for authoring documents including substantial semantic content.

BACKGROUND OF THE INVENTION

In general, electronic documents, such as, for example, Extensible Markup Language (XML)-based documents, often have an associated set of rules or grammar that describes the allowable syntactic constraint or structure. In the case of XML-based documents, this grammar is expressed in one of at least two possible formats: a Document Type Definition (DTD) or an XML-Schema. Each format essentially describes XML tags (e.g., sub-tags) that are allowed under a given XML tag. A document that conforms to the syntax rules found in the associated grammar is considered to be a valid document.

Often, syntax rules define additional constraints, referred to herein as semantic constraints, that are not considered to be part of the grammar and thus are not uniformly applied. For instance, certain syntax rules may declare that a sub-tag is optional, or the syntax rules may define a minimum and/or maximum number of times a sub-tag can be allowed under a given XML tag. However, the actual number of times a sub-tag is used will vary depending upon the particular application employing the document.

The following are some common examples of semantic constraints that are not presently captured in a conventional grammar model:

1. There are semantically and syntactically valid choices for sub-trees for any tag in the XML-based document;
2. Each choice of a sub-tree of a tag can imply the automatic selection and/or exclusion of a sub-tree of another tag (not related to the first tag by ancestry). These are called selection constraints. By way of example, FIG. 1 illustrates selection constraints in a Trading Partner Agreement (TPA) application. In this application, the TPA 100 has a section defining participants 102 and a section defining communications 104. The Participants section 102 may have two alternatives: "Alternative 1" 106, where both parties are arbitrary and all information must be entered at the time of authoring; and "Alternative 2" 108, where one of the participants is known, and information pertaining to the known participant is supplied in the model. In the Communications section 104, there may be two alternatives: "Alternative A" 110, where the communications protocol is unknown and must be selected; and "Alternative B" 112, where the protocol is known, as it is the only protocol supported by the known service provider. If the first alternative 106 in the participants section 102 is chosen (i.e., where both parties are arbitrary), then the first alternative 110 in the communications section 104 is required. Similarly, if the second alternative 106 in the participants section 102 is chosen (i.e., where the service provider is known), then the second alternative 112 in the communications section 104 should be required;
3. While a grammar may describe a tag as optional, the semantics may specify that the tag is required, prohibited, or truly optional (and left to the author for possible inclusion during the authoring of the document);
4. While a grammar may describe the minimum and/or maximum number of times a sub-tag may be included as a child of a given (parent) tag, the semantics may further require a particular number of inclusions, or it may leave the actual number to the author during the authoring of the document;
5. While a grammar may describe the data type (specifically, the XML Schema can do this), the form of the data (e.g., date format) can vary depending upon the semantics of the document (e.g., UK time vs. U.S. time vs. military time, etc.);
6. Data fields and attributes may have default values;
7. Orderable data fields can have minimum and/or maximum values;
8. Several fields (e.g., data and attribute) must have the same value, such that when one is changed, the other fields must reflect the change.

Conventionally, there are primarily two ways an XML-based document can be constructed so that it is both syntactically and semantically valid. The first approach involves the use of an XML editor that utilizes the grammar to force conformance to the syntax rules described in the grammar. Since the editor has no knowledge of the application being addressed, however, the semantic constraints are left to the person (or author) constructing the document. Often, a manual or guide prepared by an expert can be used to assist the author. There is, nevertheless, no assurance that the resulting XML-based document is semantically valid, since the author's subjective interpretation of the guide might have been incorrect.

A second conventionally used approach for constructing an XML-based document that is both syntactically and semantically valid is to use an XML editor that is specifically written for the particular application being addressed. The semantic rules would be captured in the logic of the XML editor. As such, however, the rules cannot be easily modified, and each application requiring different semantics would require a different XML editor.

Recent trends in business-to-business operations involve the description of services performed by one business partner on behalf of another. This description has been written as an XML-based document. Considering the Trading Partner Agreement (TPA) example described above, such a document not only describes the various services performed, but the format of messages between partners, the protocol used to transmit the messages, and actions taken when one of the partners is unable to operate normally. There are semantic relationships between many sections of the TPA, so that, for example, the structure or content of one section is dependent upon the structure or content of another. Ordinarily, the semantic validity of a TPA cannot be easily verified without attempting to build the business-to-business framework described by the TPA. It is too expensive to verify the validity of a document in this manner. Rather, it would be advantageous to be able to force the validity of the document during the authoring of the TPA.

As businesses and other suitable applications begin to focus, for example, on XML as a useful description language for documents, such as contracts and processes, the need to verify the semantic validity of these documents becomes imperative. Presently, there is no means to adequately specify semantic constraints similar to the manner in which syntactic constraints are described in a grammar. There is a need, therefore, in the field of document authoring (e.g., XML documents), for a semantic model, and an implementation thereof, in which semantic constraints can be easily and efficiently described and verified.

SUMMARY OF THE INVENTION

The present invention provide methods and apparatus for constructing a document model that, in conjunction with an authoring tool, produces a semantically and syntactically valid document. The present invention addresses the need to adequately specify semantic constraints, similar to the manner in which syntactic constraints are described in a grammar, and to implement the objectives of a semantic model. In this manner, semantic constraints can be easily and efficiently described and verified, without the use of an XML editor that is specifically written for a particular application being addressed.

In one illustrative aspect of the invention, a method of forming a document model for constructing a semantically and syntactically valid document comprises the following steps. First a root tag element is created representing a root tag in the document to be constructed, the root tag element including information relating to a corresponding tag, if present. Next, one or more model elements are associated with the root tag element, each model element representing an alternative to the information relating to the corresponding tag. For each of the model elements, a syntactically and semantically valid sub-tree of elements is then created, based at least in part upon a structure of the document to be constructed under one or more predetermined conditions.

Once the document model is constructed, an author, using an authoring tool for example, can traverse the document model starting at the root. When the author encounters a tag element, the authoring tool preferably generates a tag as part of the output. Then, the children of the tag element, which must be model elements, are preferably examined. Since each model element represents a possible alternative structure for the newly constructed tag, the author chooses from among the alternatives. Since the only children of a model element are either tag elements, group elements (representing collections of tags), or a single value element, the process can be repeated. Once the entire document model tree has been completely traversed, the resulting generated tags represent a semantically valid document.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
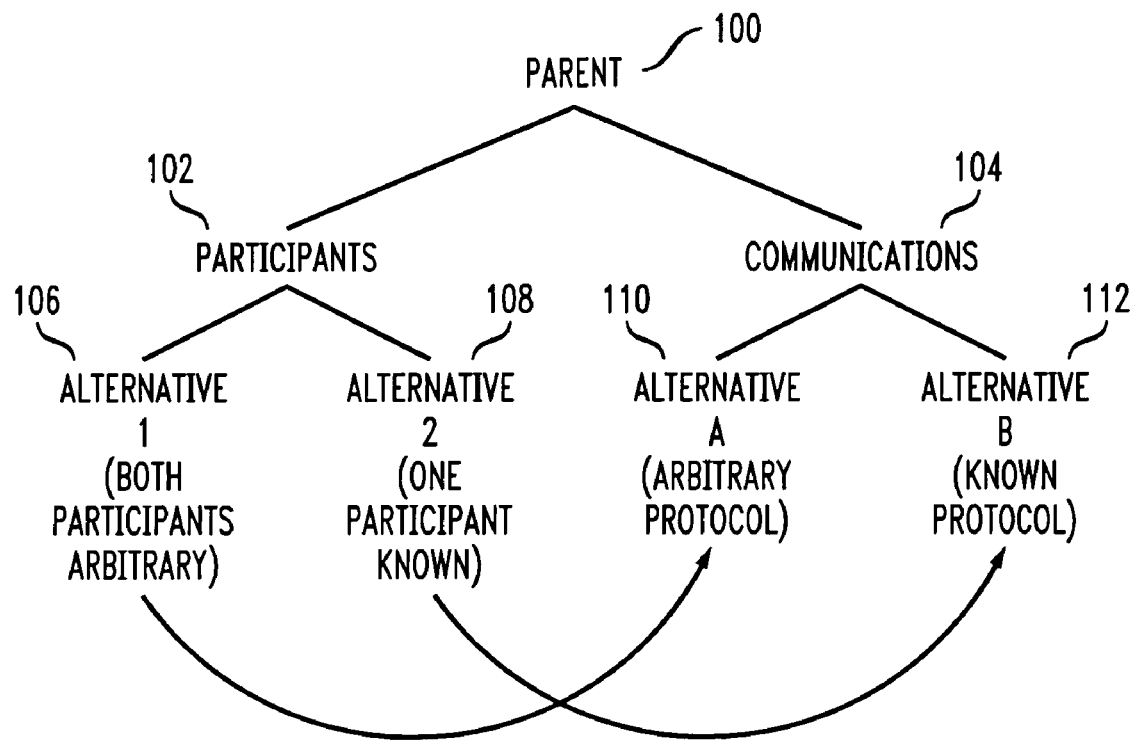
FIG. 1 is a diagram illustrating a conventional concept of selection constraints, wherein the selection of one alternative in one part of a document model implies the selection of a particular alternative in another part of the model.

The structure of a document model is one key to guaranteeing the semantic and/or syntactic validity of a corresponding document. It is generally the responsibility of the model o creator (e.g., user of the modeling tool) to ensure that regardless of the set of selections made by the author, a semantically valid document is generated.

The description presented herein illustrates how a document model is constructed from an extensible markup language (XML)-based document through an invertible mapping, whereby the original document may be reconstructed. In accordance with the present invention, the document model can be extended so that several different XML-based documents may be created from the same document model, each document preferably being both semantically and syntactically valid. Although the present invention will be described in relation to XML-based documents, it is to be appreciated that the present invention has wide applicability and may therefore be similarly employed to construct various other document types that are both semantically and syntactically valid. Moreover, while the document model may be implemented in various ways, the present invention will be described in connection with an XML implementation. Other suitable implementations may include, for example, serializable Java objects. Any implementations contemplated by the present invention, however, are preferably extendible to support additional semantics beyond those considered herein. In accordance with a preferred embodiment of the present invention, additional semantics are supported by extending the objects (e.g., XML or Java) in a document model definition.

Before describing a method for constructing a semantic model which, when used in conjunction with an authoring tool, produces a semantically valid document, it is first desirable to discuss the logical structure of a document model and define certain terms used in conjunction therewith. Such definitions will be helpful in describing how to build the unique document model of the present invention.

Document Model Structure

Preferably, in the case of XML-based document authoring, the document model comprises one or more object types or elements sufficient to represent an XML-based document, plus an additional object(s) to encode the semantics, such as those semantics presented herein above. A component in the XML-based document is preferably referred to as a tag, and a component in the document model may be referred to as an element. Beginning with a tag to be designated as a root or root tag, a grammar can preferably describe a tree (or similar hierarchical structure) of XML tags. The root of the document is preferably defined as a tag which is contained in no other tag (e.g., it is not a sub-tag). Each tag beginning with the root tag preferably includes zero or more sub-tags. If a tag includes no other sub-tags it is referred to as a leaf or leaf tag. It is contemplated that in certain scenarios a root tag may include no other sub-tags, in which case the root tag may also be considered a leaf tag. A leaf tag, while containing no other tags, may have a textual value associated therewith.

A document described in XML can be considered as a tree, so the notions of child, ancestor, path and tree height are easily understood within this context. A child of a particular tag may be defined as another tag (e.g., a sub-tag) contained immediately within that tag. Similarly, a parent of a particular tag is another tag which contains it. A tag can have at most one parent, and any number of children. An ancestor of a tag is preferably defined as a tag which is in the line of parentage of an original tag. A path between two tags (one of which must be an ancestor of the other) is preferably defined as the set of tags relating the two tags through the ancestor or descendant relationship. A length of a path is the number of elements in the path. A height of a tree may be defined as a maximum length of all paths in the tree.

A document model, in accordance with one aspect of the present invention, is itself an XML document which imposes semantic structure on another document. A document model for constructing semantically valid documents preferably includes four object types or elements, namely, a Tag Element, a Group Element, a Value Element and a Model Element. A Tag Element, as used herein, is preferably defined as a component of the document model that represents or reflects a tag in a corresponding document. The tag element preferably includes at least one attribute, namely, the identity (e.g., name) of the tag it is representing. A Group Element is preferably defined as a component of the document model that is combined or associated with a tag element when the tag associated therewith includes a collection of sub-tags.

A Value Element is preferably defined as a component of the document model that is combined with a tag element when the tag associated therewith is a leaf tag comprising text or other information. The value element may be used, for example, to store information regarding the current data value and describe the data type or format of a corresponding tag.

A Model Element is preferably defined as a component of the document model that is associated with a tag element. It is preferably the function of the model element to capture at least a portion of the semantics of the corresponding tag. One or more model elements may be associated with a particular tag element, with each model element representing one possible alternative to the information included in the tag. For example, if a given tag includes four valid semantic components, the tag element representing that tag will include four model elements associated therewith, each model element being a child of the tag element and corresponding to a different semantic component. Accordingly, all of the model elements, when considered in their entirety, associated with a given tag element preferably represent substantially all conceivable alternatives for the contents of a corresponding tag. A particular model element preferably includes possible values for attributes associated with a corresponding tag as well as references to other model elements that are to be selected and/or prohibited if the particular model element is selected by the author.

Figure 2:
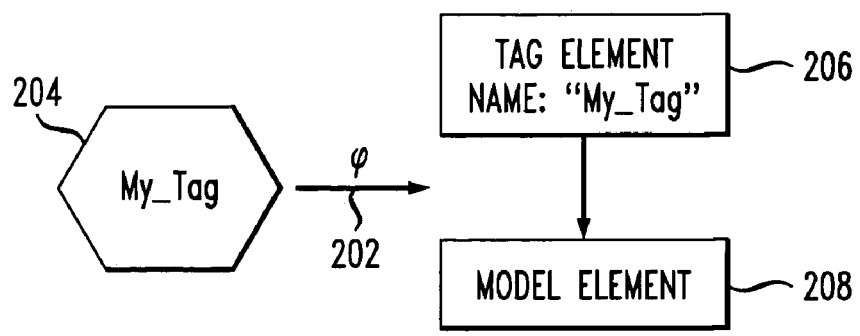
FIG. 2 is a block diagram illustrating how a tag from an XML-based document is mapped to a Tag Element/Model Element association, in accordance with the present invention.

As illustrated in FIG. 2, a mapping $\phi$ 202 between a document and a corresponding document model is defined which preferably maps a tag 204 to a tag element 206/model element 208 association. In essence, the image of any given tag 204 (e.g., the root tag and all sub-tags included therein) in an XML-based document is a tag element 206 associated with a model element 208 in the document model. Performing this mapping on all of the tags in the original document preferably yields a collection of parts or components of the document model. It now remains to assemble these parts into a complete document model.

Building a Document Model

Once the elements used in constructing the document model have been defined, a document model can be assembled to preferably represent a single semantically and syntactically valid document. In accordance with a preferred embodiment of the present invention, the document model is constructed, beginning with a root tag, by recursively defining a mapping $\phi$ from an XML-based document to a corresponding document model based, at least in part, upon a height of the document tree. The height of the document tree is an indication of the number of hierarchical levels or branches of the tree. Thus, a document tree having a height of one implies that there are no sub-tags present in the document. In describing the recursive mapping procedure of the present invention, three specific cases will be presented, namely, a first case where the height of the document tree is equal to one (1), a second case where the height of the document tree is greater than one and the tag includes a single tag (e.g., sub-tag), and a third case where the height of the document tree is greater than one and the tag includes a collection of tags.

Figure 3:
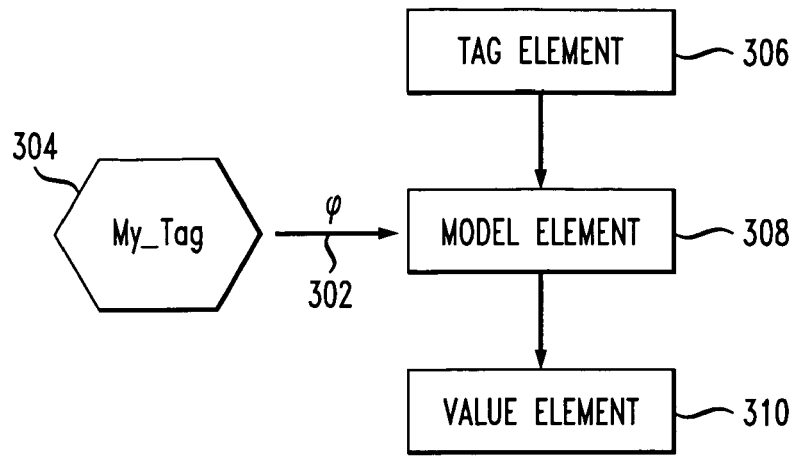
FIG. 3 is a block diagram illustrating how a leaf tag from an XML-based document is mapped to a Value Element in the document model, in accordance with the present invention.

Referring now to FIG. 3, a block diagram is shown illustrating the case where the height of the document tree is equal to one (e.g., there are no sub-tags present). As shown in FIG. 3, a single leaf tag 304 is preferably mapped 302 to a tag element 306, and a decision point, indicated by a model element 308, is preferably inserted as a child of the tag element 306. If the tag 304 has a value, then a value element 310 is preferably added beneath the model element 308. The value element 310 captures the value of the tag 304. If the tag 304 does not have a value, then value element 310 may be omitted. Since there are no other sub-tags present in this case, the document model tree is essentially completed.

Figure 4:
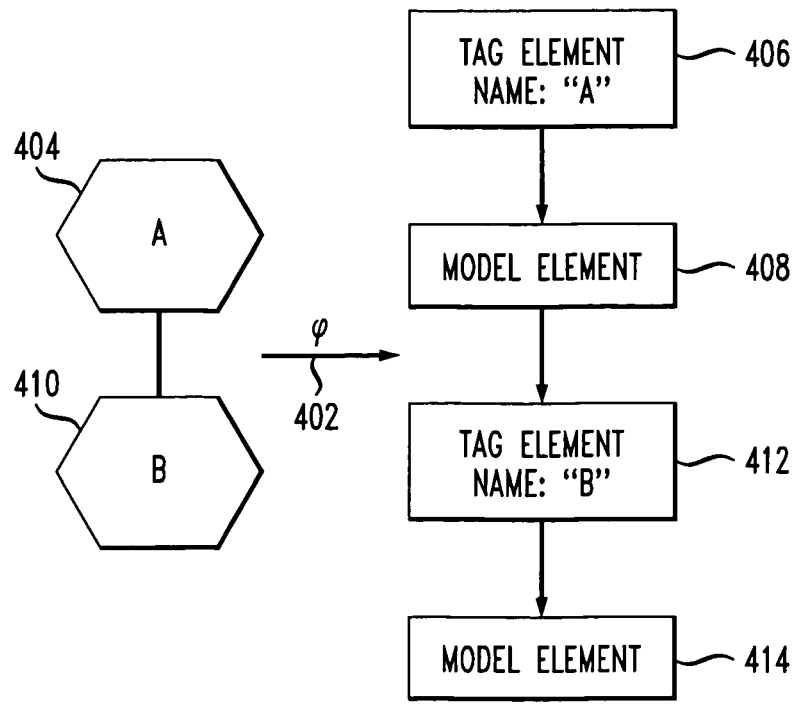
FIG. 4 is a block diagram illustrating how a sub-tag from an XML-based document is mapped to the document model, in accordance with the present invention.

In FIG. 4, there is shown a block diagram illustrating the case where the height of the document tree is greater than one, and where the tag 404 (e.g., tag "A") includes a sub-tag 410 (e.g., tag "B"). With reference to FIG. 4, a tag 404 which includes a single sub-tag 410 is preferably mapped 402 to a corresponding tag element 406. A decision point, represented by model element 408, is preferably inserted beneath and associated with tag element 406. The sub-tag 410, which is a child of tag 404, is preferably mapped 402 to tag element 412 which is preferably inserted as a child of model element 408. A second decision point, represented by model element 414, is preferably inserted beneath tag element 412. This procedure is preferably repeated until all tags have been mapped into the corresponding document model.

Figure 5:
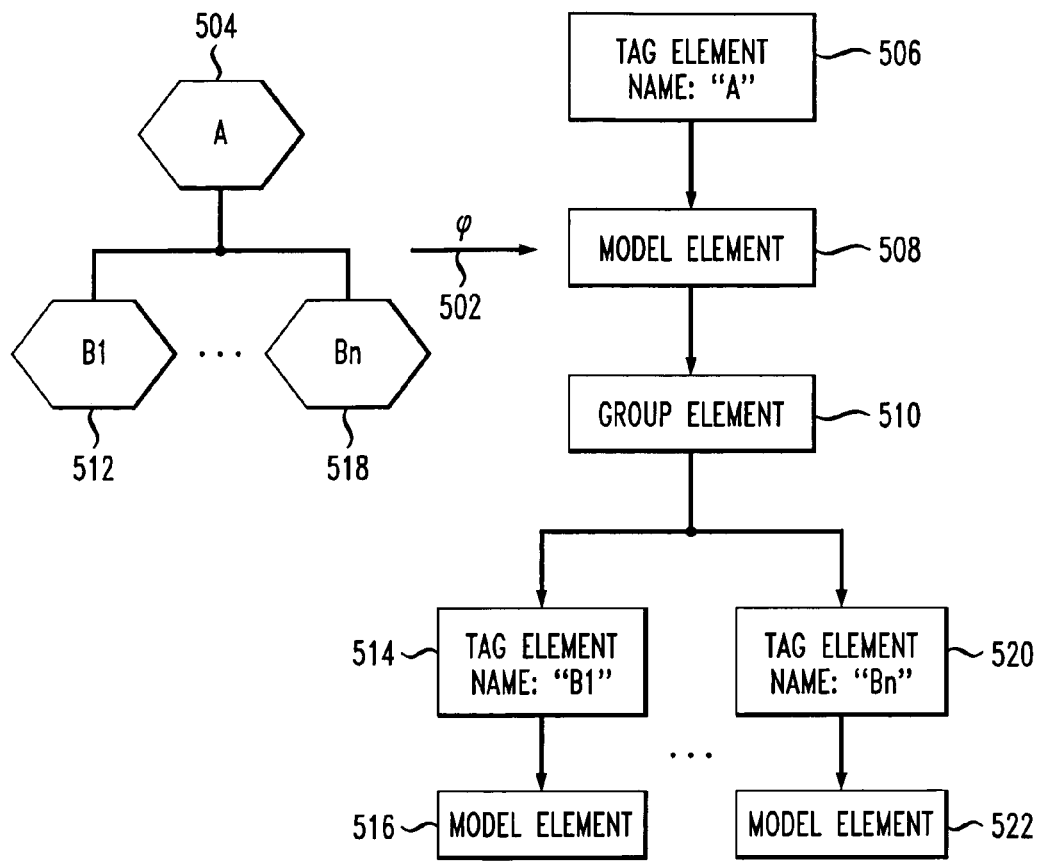
FIG. 5 is a block diagram illustrating how a collection of sub-tags in an XML-based document is mapped to the document model, in accordance with the present invention.

FIG. 5 depicts a block diagram illustrating the case where the height of the document tree is greater than one, and where a tag 504 includes a plurality of sub-tags 512, 518. As shown in FIG. 5, tag 504, which includes a collection of n sub-tags 512, 518 (labeled B1 through Bn), is preferably mapped 502 to a tag element 506 corresponding to tag 504. A decision point, represented by a model element 508, is preferably inserted as a child of tag element 504. Since tag 504 includes a collection of sub-tags 512, 518, this collection of sub-tags is preferably mapped to a group element 510 inserted beneath the model element 508. Each of the sub-tags, 512 and 518, is preferably represented by a corresponding tag element, 514 and 520, respectively, in the document model. Inserted as a child to each tag element, 514 and 520, is preferably a corresponding model element 516 and 522, respectively, as a decision point in the document model.

A document model generated from an XML-based document by the mapping $\phi$ in this manner is called a simple document model. As illustrated in FIGS. 2 through 5 and described herein above, a primary feature of the present invention is that in the simple document model, each tag element has a single model element beneath it and associated therewith. The objective here is to describe a mapping from an XML document to its corresponding model such that the original XML document may be retrieved. It is easy to see that this mapping is invertible. An important aspect of the present invention is the extension of this simple document model to a more complex document model which can then be used to map into many different XML-based (or other type) documents. The complex document model is preferably generated by allowing more than one model element under a given tag element.

Extending The Document Model

The document model described thus far can be used to generate the original XML-based document. In order to generate other documents, however, and to capture the semantics, some of which are outlined above, the present invention preferably includes additional structures to the individual elements. By way of example only, each of the semantics described herein above may be captured by the following extensions, in accordance with a preferred embodiment of the present invention:

1. There are semantically and syntactically valid choices for sub-trees for any tag in the XML-based document. Note, that while there is exactly one model element under a given tag element, other well-constructed model elements (e.g., model elements containing syntactically and semantically valid sub-trees) may be added under a tag element. There is essentially no restriction on how many model elements a tag element can possess. Now, as the authoring tool traverses the document model, it arrives at a tag element with more than one model element. By allowing the author to select one of the model elements, the structure beneath that model element can be included in the final document. Since the model maker has preferably constructed each such structure to be semantically valid, the final document will also be semantically valid.

2. Each choice of a sub-tree of a tag can imply the automatic selection or exclusion of sub-tree of another tag. Each model element is preferably assigned a unique reference identifier. Each model element also preferably includes a list of identifiers of other model elements and with each a flag indicating whether the model element to which it refers should or should not be included.

3. While a grammar may describe a tag as optional, the semantics may specify that the tag is required, prohibited, or indeed optional. A three-way flag (e.g., a flag comprising three possible values or states) is preferably set in each model element and group element for each of its constituent elements. Possible values of this flag may include, for example:

a. The element is not required;
   b. The element remains optional, and the decision to include it should be left to the author; and
   c. The element is required and included without consulting the author.

Note, that if an element has a minimum include count greater than zero, this flag will preferably always be set to the third value.

4. While a grammar may define a minimum or maximum number of times a sub-tag may be included as a child of a given tag, the semantics may require a particular set number of inclusions. Each model element and group element preferably includes a count describing the maximum number of times its constituent tags can be repeated. For example, a model element may contain either a tag element or a group element, possibly a multiple number of times. Therefore, the model element preferably comprises a single count describing how many times that tag or group element can be included. A group element preferably comprises several counts, since it may include several elements that might be repeatable. A count value of zero may be defined to indicate that the tag can be repeated any number of times.

5. While a grammar may describe a data type (specifically, the XML Schema can do this), the form or type of the data (e.g., date format, etc.) may vary. For data, a value element preferably holds or stores an index representing a type the data describes.

6. For representing the attributes of a given tag, the model element serves an important function. Since the attributes associated with a tag can vary depending upon which alternative is selected for the tag's substructure, the model element representing the chosen alternative preferably includes the appropriate attribute value(s). These attribute values are preferably passed to the tag element once the selection of an appropriate alternative is made. It is also possible to identify the form of the attribute within the model element.

7. Data fields and attributes can have default values. This value is preferably maintained in the value element.

8. Orderable data fields can have minimum and/or maximum values. The value element preferably includes one or more attributes which identify these minimum and/or maximum values.

9. Several fields are often required to have the same value. Accordingly, a dictionary is preferably included as part of the document model. Furthermore, a value element preferably comprises a flag indicating that the data included therein is a dictionary reference, rather than the actual value.

Figure 6:
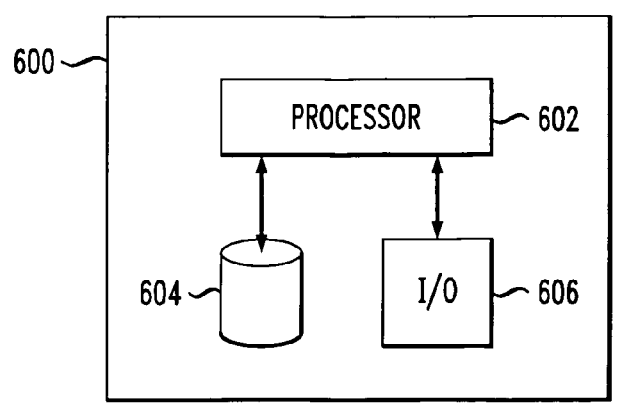
FIG. 6 is a block diagram illustrating a generalized computer system architecture for implementing the methodologies of the present invention.

Referring now to FIG. 6, a block diagram is shown illustrating a generalized hardware architecture of a computer system 600 which is suitable for implementing the various functional components/modules of a semantic model construction system as depicted in the figures and described in detail herein. It is to be understood that the components of the semantic model constructor may be implemented on one or more such computer systems 600.

With continued reference to FIG. 6, the semantic model construction system may be implemented in accordance with a processor 602, a memory 604 and at least one input/output (I/O) device 606. It is to be appreciated that the term "processor" as used herein is intended to include any processing device (e.g., digital signal processor, microcontroller, etc.), for example, one that includes a central processing unit (CPU) and/or processing circuitry. The term "memory" as used herein is intended to include memory associated with a processor or CPU, such as, for example, random access memory (RAM), read only memory (ROM), a fixed memory device (e.g., hard drive), a removable memory device (e.g., diskette), flash memory, etc. In addition, the term "I/O devices" as used herein is intended to include, for instance, one or more input devices (e.g., mouse, keyboard, etc.) for entering data to the processing unit, and/or one or more output devices (e.g., CRT display, printer, etc.) for presenting results associated with the processing unit. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in whole or in part (e.g., into RAM) and executed by a CPU.

Although illustrative embodiments of the present invention have been described herein with reference to the accompanying drawings, it is to be understood that the invention is not limited to those precise embodiments, and that various other changes and modifications man be affected therein by one skilled in the art without departing from the scope or spirit of the invention.

What is claimed is:

1. A method of forming a document model for automatically constructing a semantically and syntactically valid document, the method comprising the steps of:

beginning with a root tag, creating a plurality of tag elements corresponding to respective tags in the document to be constructed, each of the plurality of tag elements including information relating to a corresponding one of the tags;

associating one or more model elements with each of the tag elements, each model element being a child of an associated tag element and representing an alternative to the information relating to the corresponding tag, each of the model elements being distinct from the respective associated tag elements and being operative to capture semantic information of the corresponding respective tags, each of the one or more model elements associated with each of the tag elements representing a different semantic component of the corresponding tag, each model element having at most one tag element as a parent; and for each of the one or more model elements, generating a semantically and syntactically valid sub-tree of elements as a child of the one or more model elements based at least in part upon a structure of the document to be constructed under one or more predetermined conditions.

2. The method of claim 1, wherein the step of generating a semantically and syntactically valid sub-tree of elements further comprises the steps of:

assigning a tag element corresponding to a tag in the document when the tag associated therewith includes a single sub-tag, the tag element being a child of the model element corresponding to the sub-tree;

associating one or more model elements with the tag element, each of the model elements being a child of the tag element and representing an alternative semantic component to the information relating to the corresponding tag; and repeating the steps of assigning a tag element and associating one or more model elements to the tag element until all sub-tags of the tag have been mapped to the document model.

3. The method of claim 1, wherein the step of generating a syntactically and semantically valid sub-tree of elements further comprises the steps of:

associating a group element with a tag element corresponding to a tag in the document when the tag associated therewith includes a plurality of sub-tags, the group element being a child of the model element corresponding to the sub-tree;

associating a plurality of tag elements with the group element, each of the tag elements being a child of the group element and corresponding to a sub-tag in the plurality of sub-tags;

for each tag element in the plurality of tag elements, associating one or more model elements with the corresponding tag element as a child of the tag element; and repeating the steps of assigning a group element, associating a plurality of tag elements with the group element, and associating one or more model elements with the corresponding tag element until all sub-tags of the plurality of sub-tags have been mapped to the document model.

4. The method of claim 1, wherein the step of generating a syntactically and semantically valid sub-tree of elements further comprises the step of:

for each of the one or more model elements, assigning a value element as a child of the model element when the corresponding tag includes textual information associated therewith, the value element storing the textual information therein.

5. The method of claim 4, wherein the textual information includes at least one of a type and a format of the textual information.

6. The method of claim 1, wherein each of the one or more model elements includes at least one of:

attribute information associated with a corresponding tag;

one or more references to other model elements that are to be selected and/or prohibited if the model element is selected by an author of the document to be constructed; and at least a portion of semantic information associated with a corresponding tag.

7. The method of claim 1, wherein the document to be constructed is an extensible markup language (XML)-based document.

8. Apparatus for forming a document model for automatically constructing a semantically and syntactically valid document, the apparatus comprising:

at least one processor operative to: (i) beginning with a root tag, create a plurality of tag elements corresponding to respective tags in the document to be constructed, each of the plurality of tag elements including information relating to a corresponding one of the tags; (ii) associate one or more model elements with each of the tag elements each model element being a child of an associated tag element and representing an alternative to the information relating to the corresponding tag, each of the model elements being distinct from the respective associated tag elements and being operative to capture semantic information of the corresponding respective tags, each of the one or more model elements associated with each of the tag elements representing a different semantic component of the corresponding tag, each model element having at most one tag element as a parent; and (iii) for each of the one or more model elements, generate a semantically and syntactically valid sub-tree of elements as a child of the one or more model elements based at least in part upon a structure of the document to be constructed under one or more predetermined conditions.

9. The apparatus of claim 8, wherein the at least one processor is further operative to: (iv) assign a tag element corresponding to a tag in the document when the tag associated therewith includes a single sub-tag, the tag element being a child of the model element corresponding to the sub-tree; (v) associate one or more model elements with the tag element, each of the model elements being a child of the tag element and representing an alternative semantic component to the information relating to the corresponding tag; and (vi) repeat the steps of assigning a tag element and associating one or more model elements to the tag element until all sub-tags of the tag have been mapped to the document model.

10. The apparatus of claim 8, wherein the at least one processor is further operative to: (iv) associate a group element with a tag element corresponding to a tag in the document when the tag associated therewith includes a plurality of sub-tags, the group element being a child of the model element corresponding to the sub-tree; (v) associate a plurality of tag elements with the group element, each of the tag elements being a child of the group element and corresponding to a sub-tag in the plurality of sub-tags; (vi) for each tag element in the plurality of tag elements, associate one or more model elements with the corresponding tag element as a child of the tag element; and (vii) repeat the steps of assigning a group element, associating a plurality of tag elements with the group element, and associating one or more model elements with the corresponding tag element until all sub-tags of the plurality of sub-tags have been mapped to the document model.

11. The apparatus of claim 8, wherein the at least one processor is further operative to: (iv) for each of the one or more model elements, assign a value element as a child of the model element when the corresponding tag includes textual information associated therewith, the value element storing the textual information therein.

12. The apparatus of claim 8, wherein the textual information includes at least one of a type and a format of the textual information.

13. The apparatus of claim 8, wherein the document to be constructed is an extensible markup language (XML)-based document.

14. The apparatus of claim 8, wherein each of the one or more model elements includes at least one of:
attribute information associated with a corresponding tag;
one or more references to other model elements that are to be selected and/or prohibited if the model element is selected by an author of the document to be constructed; and
at least a portion of semantic information associated with a corresponding tag.

15. An article of manufacture for generating a document model for automatically constructing a semantically and syntactically valid document, comprising a machine readable medium containing one or more programs which when executed implement the steps of:
beginning with a root tag, creating a plurality of tag elements corresponding to respective tags in the document to be constructed, each of the plurality of tag elements including information relating to a corresponding one of the tags;
associating one or more model elements with each of the tag elements, each model element being a child of an associated tag element and representing an alternative to the information relating to the corresponding tag, each of the model elements being distinct from the respective associated tag elements and being operative to capture semantic information of the corresponding respective tags, each of the one or more model elements associated with each of the tag elements representing a different semantic component of the corresponding tag, each model element having at most one tag element as a parent; and
for each of the one or more model elements, generating a semantically and syntactically valid sub-tree of elements as a child of the one or more model elements based at least in part upon a structure of the document to be constructed under one or more predetermined conditions.

16. The article of claim 15, wherein the step of generating a semantically and syntactically valid sub-tree of elements further comprises the steps of:
assigning a tag element corresponding to a tag in the document when the tag associated therewith includes a single sub-tag, the tag element being a child of the model element corresponding to the sub-tree;
associating one or more model elements with the tag element, each of the model elements being a child of the tag element and representing an alternative semantic component to the information relating to the corresponding tag; and
repeating the steps of assigning a tag element and associating one or more model elements to the tag element until all sub-tags of the tag have been mapped to the document model.

17. The article of claim 15, wherein the step of generating a syntactically and semantically valid sub-tree of elements further comprises the steps of:
associating a group element with a tag element corresponding to a tag in the document when the tag associated therewith includes a plurality of sub-tags, the group element being a child of the model element corresponding to the sub-tree;
associating a plurality of tag elements with the group element, each of the tag elements being a child of the group element and corresponding to a sub-tag in the plurality of sub-tags;
for each tag element in the plurality of tag elements, associating one or more model elements with the corresponding tag element as a child of the tag element; and
repeating the steps of assigning a group element, associating a plurality of tag elements with the group element, and associating one or more model elements with the corresponding tag element until all sub-tags of the plurality of sub-tags have been mapped to the document model.

18. The article of claim 15, wherein the step of generating a syntactically and semantically valid sub-tree of elements further comprises the step of:
for each of the one or more model elements, assigning a value element as a child of the model element when the corresponding tag includes textual information associated therewith, the value element storing the textual information therein.

19. The article of claim 15, wherein each of the one or more model elements includes at least one of:
attribute information associated with a corresponding tag;
one or more references to other model elements that are to be selected and/or prohibited if the model element is selected by an author of the document to be constructed; and
at least a portion of semantic information associated with a corresponding tag.

20. The article of claim 15, wherein the document to be constructed is an extensible markup language (XML)-based document.

* * * * *